(12) United States Patent
Tao et al.

(10) Patent No.: US 10,225,010 B2
(45) Date of Patent: Mar. 5, 2019

(54) METHOD AND APPARATUS FOR MEASURING A FILTERING CHARACTERISTIC, PRE-EQUALIZER AND COMMUNICATION EQUIPMENT

(71) Applicant: FUJITSU LIMITED, Kawasaki (JP)

(72) Inventors: Zhenning Tao, Beijing (CN); Yangyang Fan, Beijing (CN); Liang Dou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 15/375,732

(22) Filed: Dec. 12, 2016

(65) Prior Publication Data

US 2017/0170897 A1 Jun. 15, 2017

(30) Foreign Application Priority Data

Dec. 11, 2015 (CN) .......................... 2015 1 0920180

(51) Int. Cl.
*H04L 27/01* (2006.01)
*H04B 10/079* (2013.01)
*H04B 10/516* (2013.01)

(52) U.S. Cl.
CPC ... *H04B 10/07955* (2013.01); *H04B 10/5161* (2013.01); *H04L 27/01* (2013.01)

(58) Field of Classification Search
CPC .......... H04B 10/07955; H04B 10/5161; H04L 27/01
USPC .......................................................... 398/38
See application file for complete search history.

(56) References Cited

U.S. PATENT DOCUMENTS

| 8,315,528 B2* | 11/2012 | Roberts | H04B 10/60 398/202 |
| 2005/0009471 A1* | 1/2005 | Paul | H04B 17/309 455/62 |
| 2009/0142076 A1* | 6/2009 | Li | H04B 10/61 398/208 |
| 2009/0245815 A1* | 10/2009 | Zhang | H04B 10/61 398/208 |
| 2009/0245816 A1* | 10/2009 | Liu | H04B 10/60 398/208 |
| 2009/0304064 A1* | 12/2009 | Liu | H04L 25/03057 375/232 |

(Continued)

OTHER PUBLICATIONS

Danish Rafique et al., "Digital Pre-Emphasis in Optical Communication Systems: On the DAC Requirements for Terabit Transmission Applications", Journal of Lightwave Technology, vol. 32, No. 19, Oct. 1, 2014, pp. 3247.

(Continued)

*Primary Examiner* — Amritbir K Sandhu
(74) *Attorney, Agent, or Firm* — Staas & Halsey LLP

(57) ABSTRACT

A method and apparatus for measuring a filtering characteristic, pre-equalizer and communication equipment. The apparatus for measuring a filtering characteristic includes: a first processing unit configured to determine a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiving end.

11 Claims, 10 Drawing Sheets

(56) References Cited

U.S. PATENT DOCUMENTS

| | | | | |
|---|---|---|---|---|
| 2010/0003028 | A1* | 1/2010 | Zhang | H04B 10/61 398/65 |
| 2010/0046958 | A1* | 2/2010 | Awadalla | H04B 10/25137 398/149 |
| 2010/0142952 | A1* | 6/2010 | Qian | H04B 10/2513 398/65 |
| 2011/0064169 | A1* | 3/2011 | Li | H04B 10/61 375/344 |
| 2011/0064421 | A1* | 3/2011 | Zhang | H04B 10/6161 398/208 |
| 2011/0150505 | A1* | 6/2011 | Roberts | H04B 10/60 398/208 |
| 2012/0189320 | A1* | 7/2012 | Zelensky | H04B 10/2569 398/158 |
| 2013/0045016 | A1* | 2/2013 | Doran | H04B 10/50 398/214 |
| 2015/0023674 | A1* | 1/2015 | Salsi | H04B 10/61 398/202 |
| 2016/0036524 | A1* | 2/2016 | Yan | H04L 27/0014 398/25 |
| 2016/0065326 | A1* | 3/2016 | Kisaka | H04L 27/2096 398/65 |
| 2017/0104643 | A1* | 4/2017 | Zhao | H04L 7/0087 |
| 2017/0170896 | A1* | 6/2017 | Tao | H04B 10/07955 |
| 2017/0170897 | A1* | 6/2017 | Tao | H04B 10/07955 |
| 2017/0170901 | A1* | 6/2017 | Fan | H04B 10/25073 |
| 2017/0170902 | A1* | 6/2017 | Fan | H04B 10/25073 |
| 2017/0227585 | A1* | 8/2017 | Chen | G01R 25/005 |
| 2017/0272279 | A1* | 9/2017 | Zhao | H04L 25/0224 |
| 2018/0123700 | A1* | 5/2018 | Li | H04B 10/0795 |

OTHER PUBLICATIONS

Antonio Napoli et al., "Novel DAC digital pre-emphasis algorithm for next-generation flexible optical transponders", OFC2015 Th3G. 6.

* cited by examiner

METHOD AND APPARATUS FOR MEASURING A FILTERING CHARACTERISTIC, PRE-EQUALIZER AND COMMUNICATION EQUIPMENT

CROSS-REFERENCE TO RELATED APPLICATIONS

This application claims the priority benefit of Chinese Patent Application No. 201510920180.X, filed on Dec. 11, 2015 in the Chinese Intellectual Property Office, the disclosure of which is incorporated herein in its entirety by reference.

BACKGROUND

1. Field

The present disclosure relates to the field of communications, and in particular to a method and apparatus for measuring a filtering characteristic, pre-equalizer and communication equipment.

2. Description of the Related Art

As the requirements of an optical communication system on low cost, miniature and flexible configuration, optical and electrical bandwidths of a transmitter of the optical communication system are reduced for various reasons. Currently, a problem of narrow bandwidth may be overcome by using pre-equalization, pre-distortion and pre-emphasis technologies in a digital domain.

FIG. 1 is a schematic diagram of a transmitter in the prior art using the digital pre-equalization technology. As shown in FIG. 1, the transmitter 100 includes an emitter 101, a pre-equalizer 102, a digital-to-analog converting module 103, a laser 104 and an optical modulator 105, the optical modulator 105 including a pluggable interface, and an electrical driving amplifier, etc. Wherein, the emitter 101 emits digital electrical signals, the pre-equalizer 102 pre-compensates for a filtering damage to the emitted digital electrical signals brought about by subsequent filtering modules of the transmitter 100, such as the digital-to-analog converting module 103 and the optical modulator 105, the compensated digital electrical signals are converted into analog signals after passing through the digital-to-analog converting module 103, and optical signals are outputted after the analog signals are modulated by the optical modulator 105. Here, the filtering damage brought about by the subsequent modules after the pre-equalizer 102 in the transmitter 100 is referred to as a filtering characteristic of a transmitting end.

FIG. 2 is a schematic diagram of a receiver in the prior art. As shown in FIG. 2, the receiver 200 includes an optical coherent demodulator 201, a local laser 202, an analog-to-digital converting module 203 and a receiving device 204, the optical coherent demodulator 201 consisting of an optical mixer (having no filtering damage) and an optical-to-electrical converter (having filtering damages). Wherein, optical signals outputted from the transmitter 100 are demodulated into analog electrical signals by the optical coherent demodulator 201, the analog electrical signals are converted into digital electrical signals by the analog-to-digital converting module 203, and the digital electrical signals are received by the receiving device 204. And wherein, a filtering damage exists in the optical signals received from the transmitter 100 after passing through the filtering modules of the receiver 200, such as the optical coherent demodulator 201 and the analog-to-digital converting module 203. Here, the filtering damage is referred to as a filtering characteristic of a receiving end.

Currently, a common frequency domain or time domain method may be used for pre-equalization, and a coefficient of a pre-equalizer may be obtained by using many method in the prior art, such as zero forcing, and minimum mean square error, etc.; however, a filtering characteristic of a transmitting end needs to be known to these methods.

It should be noted that the above description of the background art is merely provided for clear and complete explanation of the present disclosure and for easy understanding by those skilled in the art. And it should not be understood that the above technical solution is known to those skilled in the art as it is described in the background art of the present disclosure.

SUMMARY

Additional aspects and/or advantages will be set forth in part in the description which follows and, in part, will be apparent from the description, or may be learned by practice of the invention.

At present, instruments are often used to measure a filtering characteristic of a transmitting end or a receiving end, which is high in cost, and is hard in large-scale use.

Embodiments of the present disclosure provide a method and apparatus for measuring a filtering characteristic, pre-equalizer and communication equipment. In the method, the filtering characteristics of the receiving end and the transmitting end may be determined by using an amplitude of a receiving signal obtained at different frequency offsets of a transmitting laser and a local laser and the transmitter and the receiver themselves, with no need of use of extra instrument, thereby avoiding the problems of high cost and uneasy large-scale use brought about by measurement of filtering characteristic by using instruments.

The above aim of the embodiments of the present disclosure is achieved by the following technical solutions.

According to a first aspect of the embodiments of the present disclosure, there is provided an apparatus for measuring a filtering characteristic, including:

a first processing unit configured to determine a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiving end.

According to a second aspect of the embodiments of the present disclosure, there is provided a pre-equalizer, including:

a characteristic measuring unit configured to determine a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiver end, and determine a filtering characteristic of the transmitting end according to the filtering characteristic of the receiving end and a joint response of the filtering characteristic of the receiving end and the filtering characteristic of the transmitting end, and a pre-equalizing unit configured to determine a coefficient of the pre-equalizer according to the filtering characteristic of the transmitting end, and perform pre-equalization on a transmission signal by using the coefficient of the pre-equalizer.

According to a third aspect of the embodiments of the present disclosure, there is provided an optical communication equipment, including the apparatus for measuring a filtering characteristic as described in the first aspect.

An advantage of the embodiments of the present disclosure exists in that in the method, the filtering characteristics of the receiving end and the transmitting end may be determined by using an amplitude of a receiving signal obtained at different frequency offsets of a transmitting laser and a local laser and the transmitting and the receiving themselves, with no need of use of extra instrument, thereby avoiding the problems of high cost and uneasy large-scale use brought about by measurement of filtering characteristics by using instruments.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

Figure 1:
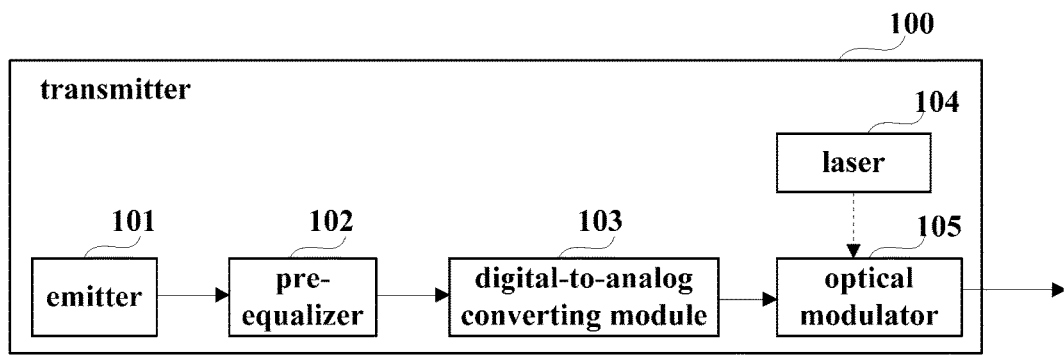
FIG. 1 is a schematic diagram of a transmitter in the prior art using the digital pre-equalization technology.

Reference will now be made in detail to the embodiments, examples of which are illustrated in the accompanying drawings, wherein like reference numerals refer to the like elements throughout. The embodiments are described below to explain the present invention by referring to the figures.

These and further aspects and features of the present disclosure will be apparent with reference to the following description and attached drawings. In or that the principle and implementations of the present disclosure are easily understood by those skilled in the art, embodiments of the present disclosure shall be described taking an optical loopback mode as an example. However, it should be understood that the embodiments of the present disclosure are not limited thereto. For example, the method and apparatus provided by the embodiments of the present disclosure are also applicable to other modes where a transmitter and a receiver are connected to each other.

In these embodiments, the filtering characteristic of the transmitting end refers to a filtering damage brought about by a filtering module of a transmitter or a filtering module of a transmitting end of a transceiver, which is denoted by $G(f)$; and the filtering characteristic of the receiving end refers to a filtering damage brought about by a filtering module of a receiver or a filtering module of a receiving end of a transceiver, which is denoted by $H(f)$.

In these embodiments, the joint response of the filtering characteristic of the transmitting end and the filtering characteristic of the receiving end refers to a joint filtering damage brought about by the filtering modules of the transmitter and the receiver, or a joint filtering damage brought about by the filtering modules of the transmitting end and the receiving end of the transceiver, which is denoted by $G(f)H(f)$.

In the known art, instruments are often used to measure the filtering characteristic of the transmitting end or the receiving end, which is high in cost, and is hard in large-scale use. It was found by the inventors in the implementation of the present disclosure that an amplitude of a receiving signal obtained at different frequency offsets of a transmitting laser and a local laser may be used to determine the filtering characteristic of the receiving end H(f), and furthermore, to determine the filtering characteristic G(f) of the transmitting end.

Preferred embodiments of the present disclosure shall be described below with reference to the accompanying drawings.

Embodiment 1

Figure 3:
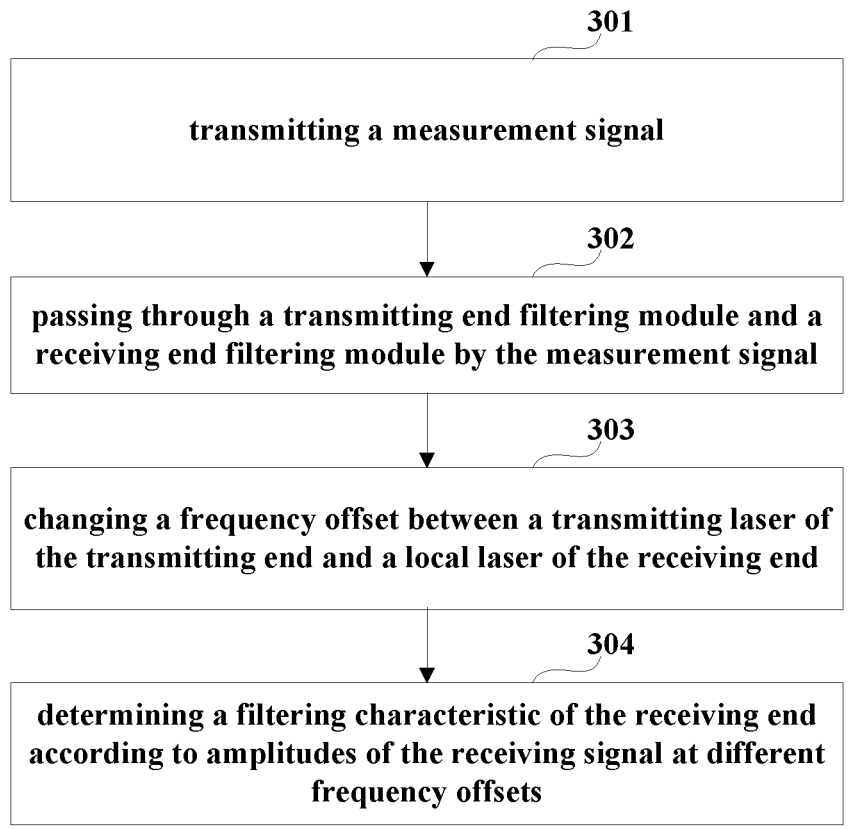
FIG. 3 is a flowchart of the method for measuring a filtering characteristic of Embodiment 1.
Figure 6:
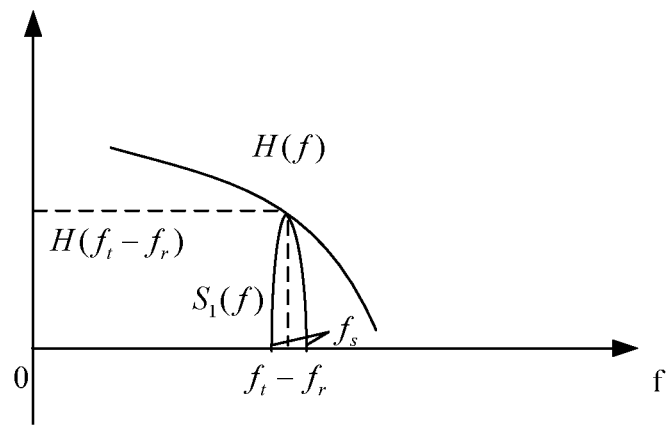
FIG. 6 is a schematic diagram of a relationship between a filtering characteristic of a receiving end and an amplitude of a receiving signal in Embodiment 1.

FIG. 3 is a flowchart of the method for measuring a filtering characteristic of Embodiment 1. Referring to FIG. 3, the method includes:

step 301: transmitting a measurement signal;

in this embodiment, the measurement signal transmitted in step 301 is denoted by S(f), which may be a narrowband signal, the narrowband signal referring to a signal of a small bandwidth relative to that of the system; wherein, a level that the bandwidth of the signal is relatively small is related to a frequency resolution indicating a filtering characteristic; and wherein, filtering characteristic is deemed as being identical within the frequency resolution, and when the bandwidth of the signal is less than the frequency resolution, the signal may be deemed as a narrowband signal; in FIG. 6, $S_1(f)$ is an exemplary diagram of a narrowband signal; as shown in FIG. 6, a bandwidth of the signal is $f_s$, and when a frequency resolution is set to be greater than $f_s$, the signal may be deemed as a narrowband signal;

in this embodiment, the narrowband signal may be a direct current signal, a single-frequency signal, or a pseudo-random signal of a low Baud rate; for example, the single-frequency signal may be single-frequency real signal, or a single-frequency pure imaginary signal, and the pseudo-random signal of a low Baud rate may be a random real signal, a random pure imaginary signal, or a random complex signal, etc., and this embodiment is not limited thereto.

step 302: passing through a transmitting end filtering module and a receiving end filtering module by the measurement signal, so as to obtain a receiving signal;

in this embodiment, after the measurement signal S(f) passes through the transmitting end filtering module and the receiving end filtering module, the receiving signal may be obtained, which is denoted by R(f); where, R(f)=S(f)G(f)H(f).

step 303: changing a frequency offset between a transmitting laser of the transmitting end and a local laser of the receiving end;

in this embodiment, different frequency offsets $(f_{t1}-f_{r1})$, $(f_{t2}-f_{r2})$, . . . $(f_{tm}-f_{rm})$ may be obtained by changing a frequency $f_t$ of the transmitting laser (such as $f_{t1}$, $f_{t2}$, . . . , $f_{tm}$) or a frequency $f_r$ of the local laser (such as $f_{r1}$, $f_{r2}$, . . . , $f_{rm}$), or different frequency offsets $(f_{t1}-f_{r1})$, $(f_{t2}-f_{r2})$, . . . $(f_{tm}-f_{rm})$ may be obtained by changing a frequency $f_t$ of the transmitting laser (such as $f_{t1}$, $f_{t2}$, . . . , $f_{tm}$) and a frequency $f_r$ of the local laser (such as $f_{r1}$, $f_{r2}$, . . . , $f_{rm}$) at the same time, and this embodiment is not limited thereto.

step 304: determining a filtering characteristic of the receiving end according to amplitudes of the receiving signal at different frequency offsets;

in this embodiment, as the transmitting laser of a frequency $f_t$ is provided, a signal is changed into $S(f+f_t) \times G(f+f_t)$ after passing through an optical modulator; as the local laser of a frequency $f_r$ is provided, a baseband signal is changed into $S(f+f_t-f_r) \times G(f+f_t-f_r)$ after being optically mixed, and the receiving signal is $R(f)=H(f) \times G(f+f_t-f_r) \times S(f+f_t-f_r)$; when the above frequency offset is the first frequency offset $(f_{t1}-f_{r1})$, the amplitude of the acquired receiving signal R(f) at a frequency point $(f_1=f_{t1}-f_{r1})$ to which the first frequency offset corresponds is determined, when the frequency offset is change into the second frequency offset $(f_{t2}-f_{r2})$, the above process is repeated, so as to determine the amplitude of the acquired receiving signal R(f) at a frequency point $(f_2=f_{t2}-f_{r2})$ to which the second frequency offset corresponds, as so on; and when the frequency offset is change into an n-th frequency offset $(f_{tn}-f_{rn})$, the amplitude of the acquired receiving signal R(f) at a frequency point $(f_n=f_{tn}-f_{rn})$ to which the n-th frequency offset corresponds is determined; thus, the amplitudes of the acquired receiving signal R(f) at multiple frequency points $f_1, f_2, \ldots, f_n$ may be obtained at multiple different frequency offsets; and finally, the filtering characteristic of the receiving end H(f) may be obtained according to the above obtained amplitude of the receiving signal.

It can be seen from this embodiment that by passing through the filtering modules of the transmitting end and the receiving end by the measurement signal and changing the frequency offset, H(f) is determined according to the amplitudes of the receiving signal at different frequency offsets, without use of measurement instruments for the measurement, thereby avoiding the problems of high cost and uneasy large-scale use.

In this embodiment, in step 301, a emitter of a transmitter or a transceiver may be used to transmit the measurement signal; in step 302, the transmitting end filtering module is a transmitting end filtering module of a transmitter or a transceiver of which a transmitting end filtering characteristic is to be measured, and the receiving end filtering module is a receiving end filtering module of a receiver or a transceiver of which a receiving end filtering characteristic is to be measured. Taking the transmitter shown in FIG. 1 as an example, when the receiving end filtering characteristic is measured, the pre-equalizer 102 of the transmitter 100 is disabled, and the emitter 101 transmits the measurement signal to the digital-to-analog converting module 103.

In this embodiment, in step 301, when the measurement signal is transmitted, the original emitter of the transmitter or the transceiver is reused, and a specifically provided emitter may also be used to transmit the above measurement signal. Then the measurement signal is made to pass through the transmitting end filtering module and the receiving end filtering module, without passing through the pre-equalizer.

Step 304 shall be described below in detail with reference to the accompanying drawings.

Figure 4:
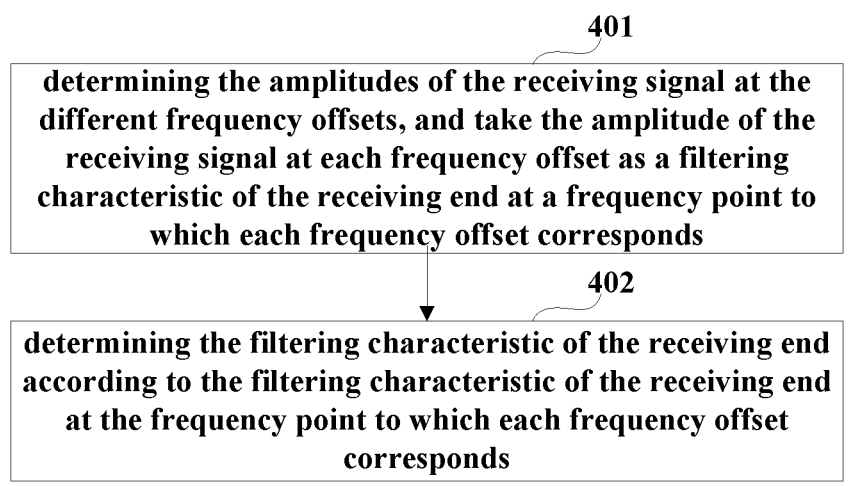
FIG. 4 is a flowchart of an implementation of step 304 in Embodiment 1.

FIG. 4 is a flowchart of an implementation of step 304 in this embodiment. As shown in FIG. 4, step 304 may include:

step 401: determining the amplitudes of the receiving signal at the different frequency offsets, and take the amplitude of the receiving signal at each frequency offset as a filtering characteristic of the receiving end at a frequency point to which each frequency offset corresponds; and step 402: determining the filtering characteristic of the receiving end according to the filtering characteristic of the receiving end at the frequency point to which each frequency offset corresponds.

In this embodiment, it was found by the inventors after many times of studies that following relationship exists between the filtering characteristic H(f) of the receiving end and the amplitudes of the receiving signal R(f) acquired at the above different frequency offsets ($f_t-f_r$).

Figure 5:
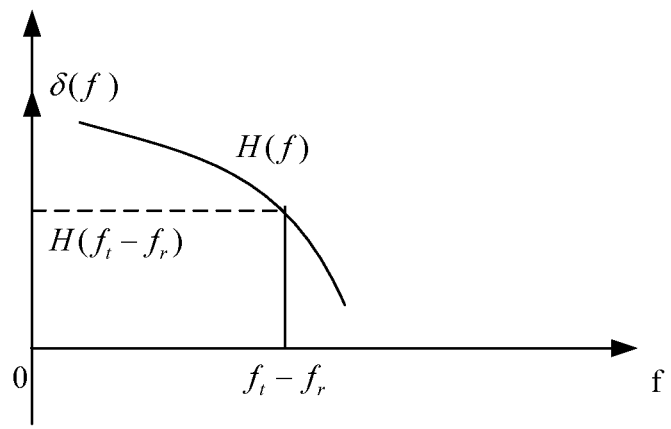
FIG. 5 is a schematic diagram of a relationship between a filtering characteristic of a receiving end and an amplitude of a receiving signal in Embodiment 1.

For example, when the measurement signal is a direct current signal, FIG. 5 is a schematic diagram of a relationship between the filtering characteristic of the receiving end in a frequency domain and an amplitude of the receiving signal. As shown in FIG. 5, a signal S(f) in the direct current signal frequency domain is an impulse signal, which is denoted by $\delta(f)$; as R(f)=H(f)G(f+$f_t-f_r$)S(f+$f_t-f_r$), G(f+$f_t-f_r$)S(f+$f_t-f_r$)=$\delta(f_t-f_r)$; where, $\delta(f_t-f_r)$ denotes there exists an impulse at a frequency point (f=$f_t-f_r$), and values of the signal at other frequency points are 0; hence, R(f)=H($f_t-f_r$)$\delta(f_t-f_r)$, that is, the relationship between the filtering characteristic H(f) of the receiving end and the amplitudes of the receiving signal R(f) acquired at the above different frequency offsets ($f_t-f_r$) is: the amplitude of the signal R(f) at the frequency point (f=$f_t-f_r$) to which the above frequency offset ($f_t-f_r$) corresponds is H($f_t-f_r$), hence, the amplitude the acquired receiving signal R(f) at the frequency point (f=$f_t-f_r$) to which the above frequency offset ($f_t-f_r$) corresponds may be taken as filtering characteristic H($f_t-f_r$) of the receiving end at the frequency offset ($f_t-f_r$). Transmission of the direct current signal is kept constant and the frequency $f_t$ of the transmitting laser and/or the frequency $f_r$ of the local laser is/are changed many times. In step 401, the amplitude of the receiving signal at each frequency offset is taken as the filtering characteristic of the receiving end at the frequency point to which each frequency offset corresponds. And in step 402, the filtering characteristics of the receiving end at the frequency points to which the different frequency offsets correspond determined in step 401 are integrated, thereby obtaining the filtering characteristics of the receiving end in the whole frequency range.

How to determine the filtering characteristic of the receiving end is described above taking that the measurement signal is a direct current signal as an example only; however, this embodiment is not limited thereto. FIG. 6 is a schematic diagram of a relationship between the filtering characteristic of the receiving end in the frequency domain and the amplitude of the receiving signal when the measurement signal is $S_1(f)$. As shown in FIG. 6, as a bandwidth occupied by $S_1(f)$ is very narrow, it may be approximated to $\delta(f)$. It can be seen from the above description that G(f+$f_t-f_r$)$S_1$(f+$f_t-f_r$)≈$\delta(f_t-f_r)$, and the above method may likewise be used to determine the filtering characteristic of the receiving end, which shall not be described herein any further.

In this embodiment, in order to determine a value of the frequency offset ($f_t-f_r$) after each time of change, in an implementation, it may be determined according to the receiving signal R(f). For example, Fourier transform is performed on the receiving signal R(f), and a value of frequency to which a peak value of an amplitude of the transformed signal corresponds is the above frequency offset ($f_t-f_r$); and in another implementation, the frequency offset may be obtained through calculation according to the set frequency of the transmitting laser and the local laser, such as obtaining the above frequency offset ($f_t-f_r$) by directly subtracting the frequency $f_t$ of the transmitting laser by the frequency $f_r$ of the local laser.

It can be seen from this embodiment that by passing through the filtering modules of the transmitting end and the receiving end by the measurement signal and changing the frequency offset, H(f) is determined according to the amplitudes of the receiving signal at different frequency offsets, without use of measurement instruments for the measurement, thereby avoiding the problems of high cost and uneasy large-scale use.

Embodiment 2

Embodiment 2 further provides a method for measuring a filtering characteristic, which differs from Embodiment 1 in that in this embodiment, the filtering characteristic of the transmitting end may be determined in addition to determining the filtering characteristic of the receiving end.

Figure 7:
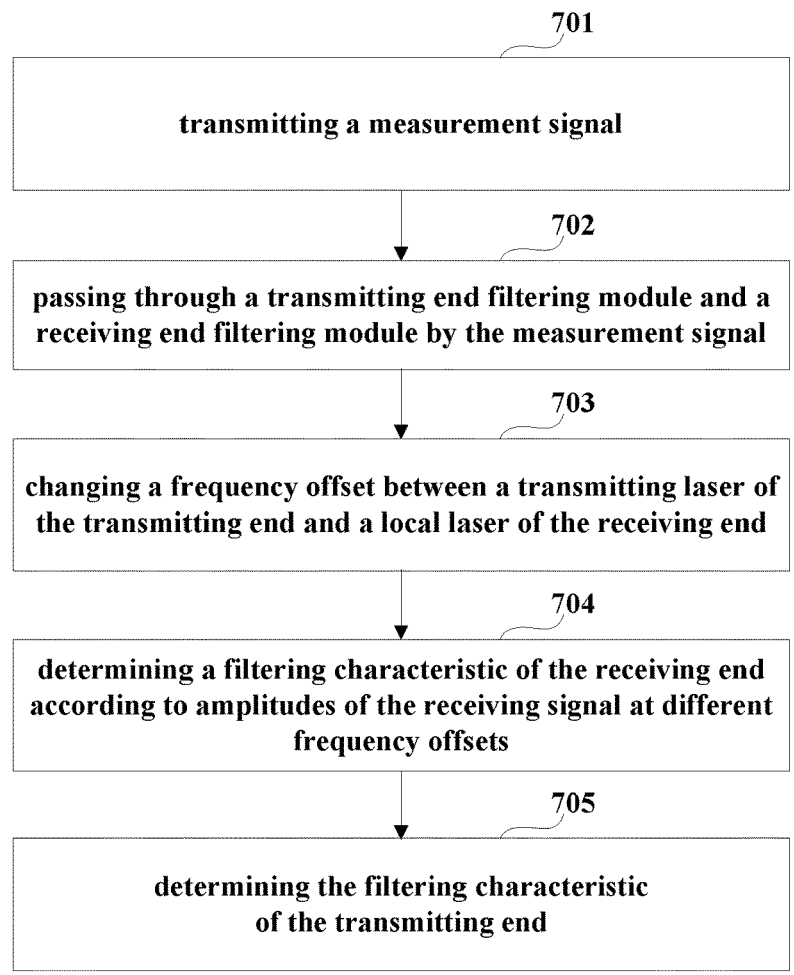
FIG. 7 is a flowchart of the method for measuring a filtering characteristic of Embodiment 2.

FIG. 7 is a flowchart of the method for measuring a filtering characteristic of this embodiment. As shown in FIG. 7, steps 701-704 are used for determining the filtering characteristic of the receiving end, particular implementations of which being identical to steps 301-304 in Embodiment 1, and being not going to be described herein any further.

In this embodiment, the method may further include:

step 705: determining the filtering characteristic of the transmitting end.

In this embodiment, a joint response of the filtering characteristic of the receiving end and the filtering characteristic of the transmitting end may be measured first, and the filtering characteristic of the transmitting end may be determined according to the joint response and the filtering characteristic of the receiving end obtained in step 704. In particular, a new measurement signal S'(f) may be transmitted in step 705, and a receiving signal R'(f) is obtained after the new measurement signal passes through the filtering modules of the transmitting end and the receiving end; and the joint response is determined according to the measurement signal S'(f) and the receiving signal R'(f). For example, as R'(f)=H(f)×G(f)×S'(f), the joint response of the filtering characteristic of the transmitting end and the filtering characteristic of the receiving end is J(f)=H(f)×G(f)=R'(f)/S'(f), that is, when the transmission signal S'(f) of the transmitting end and the receiving signal R'(f) of the receiving end are known, the above joint response may be directly determined according to the above relationship.

Wherein, in order to facilitate the measurement and improve accuracy of the measurement, the frequency offset between the transmitting laser and the local laser may be set to be 0; and wherein the new measurement signal S'(f) may be a wide frequency signal covering the whole frequency of the system, thereby avoiding a case that a denominator is 0 in calculating the joint response.

In step 705, the filtering characteristic G(f) of the transmitting end is determined according to the filtering characteristic H(f) of the receiving end determined in step 704 and the determined joint response J(f), that is, the filtering characteristic of the transmitting end G(f)=J(f)/H(f).

In this embodiment, an order of measuring the joint response J(f) in step 705 and measuring the filtering characteristic H(f) of the receiving end in step 704 is not limited.

In this embodiment, in order to improve the accuracy of the measurement, when the frequency/frequencies of the transmitting laser and/or the local laser change(s), power of the transmitting laser and/or the local laser needs to be kept stable; wherein, the method for measuring a filtering characteristic further includes: calibrating power of the transmitting laser and the local laser.

In this embodiment, optical power may be measured by providing a photodetector PD, and calibration is performed when the optical power changes, so that the optical power is kept stable.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments.

Embodiment 3

Embodiment 3 further provides an apparatus for measuring a filtering characteristic. As a principle of the apparatus for solving problems is similar to those of the methods in embodiments 1 and 2, the implementations of the methods in embodiments 1 and 2 may be referred to for implementation of the apparatus, and repeated parts shall not be described herein any further.

Figure 8:
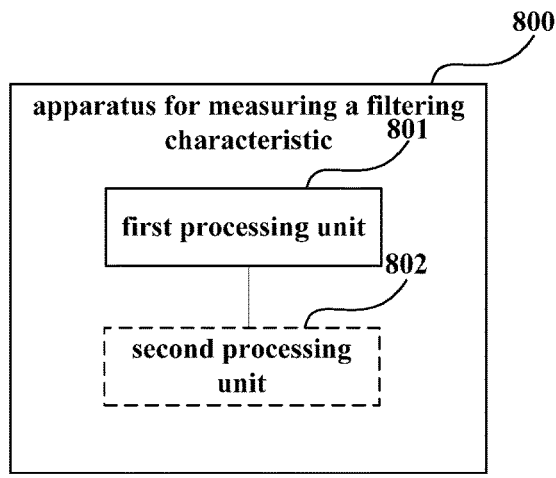
FIG. 8 is a schematic diagram of a structure of the apparatus for measuring a filtering characteristic in Embodiment 3.

FIG. 8 is a schematic diagram of a structure of the apparatus for measuring a filtering characteristic in Embodiment 3. As shown in FIG. 8, the apparatus 800 includes:

a first processing unit 801 configured to determine a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiving end.

In this embodiment, step 304 in Embodiment 1 may be referred to for a particular implementation of the first processing unit 801, which shall not be described herein any further.

In this embodiment, Embodiment 1 may be referred to for a particular implementation of the measurement signal, which shall not be described herein any further.

Figure 9:
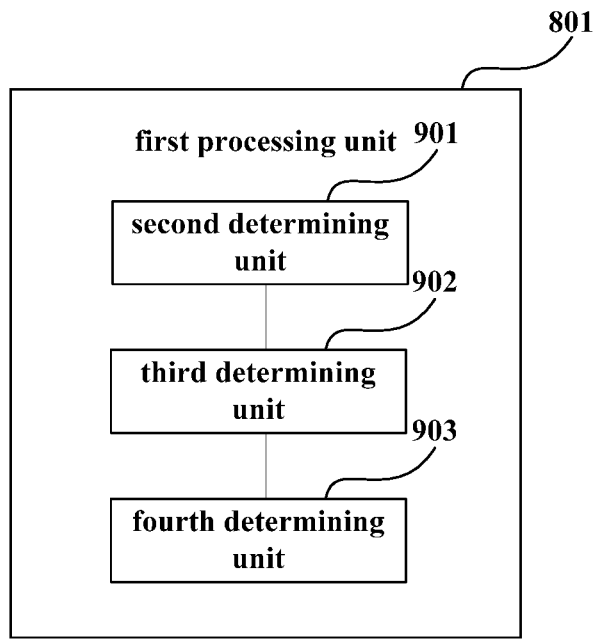
FIG. 9 is a schematic diagram of a structure of a first processing unit in Embodiment 3.

FIG. 9 is a schematic diagram of a structure of an implementation of the first processing unit 801 in this embodiment. As shown in FIG. 9, the first processing unit 801 includes:

a second determining unit 901 configured to determine the amplitudes of the receiving signal at the different frequency offsets, and take the amplitude of the receiving signal at each frequency offset as a filtering characteristic of the receiving end at a frequency point to which each frequency offset corresponds; and a third determining unit 902 configured to determine the filtering characteristic of the receiving end according to the filtering characteristic of the receiving end at the frequency point to which each frequency offset corresponds determined by the second determining unit 901.

In this embodiment, steps 401-402 in Embodiment 1 may be referred to for particular implementations of the second determining unit 901 and the third determining unit 902, which shall not be described herein any further.

Wherein, as shown in FIG. 9, the first processing unit 801 may further include:

a fourth determining unit 903 configured to determine the frequency offset according to the receiving signal, or calculate the frequency offset according to the frequencies of the transmitting laser and the local laser; wherein, Embodiment 1 may be referred to for a particular implementation of the fourth determining unit 903, which shall not be described herein any further.

In this embodiment, as shown in FIG. 8, the apparatus may further include:

a second processing unit 802 (optional) configured to measure a filtering characteristic of the transmitting end.

Figure 10:
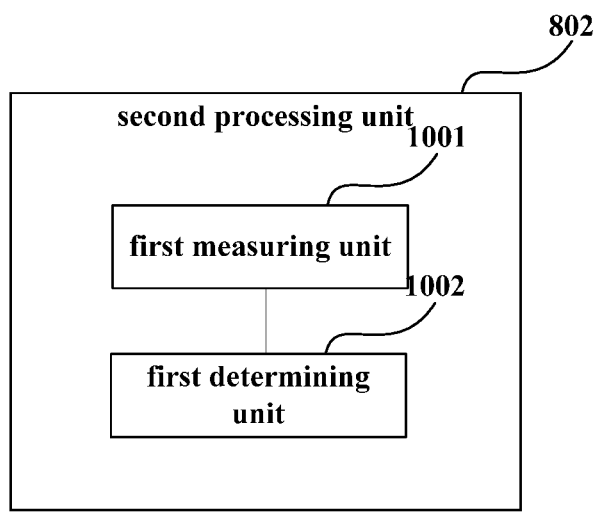
FIG. 10 is a schematic diagram of a structure of a second processing unit in Embodiment 3.

FIG. 10 is a schematic diagram of a structure of the second processing unit 802 in this embodiment. As shown in FIG. 10, the second processing unit 802 includes:

a first measuring unit 1001 configured to measure a joint response of the filtering characteristic of the receiving end and the filtering characteristic of the transmitting end; and a first determining unit 1002 configured to determine the filtering characteristic of the transmitting end according to the filtering characteristic of the receiving end and the joint response.

Wherein, step 705 in Embodiment 2 may be referred to for particular implementations of the first measuring unit 1001 and the first determining unit 1002, which shall not be described herein any further.

In this embodiment, alternatively, when an emitter and filtering modules of the transmitter or the transceiver are used, the apparatus 800 may further include a setting unit (not shown) configured to set the pre-equalizer of the transmitter or the transceiver, so as to disable the pre-equalizer. However, this embodiment is not limited thereto, and the setting unit may also be provided in a transmitter, a receiver, or a transceiver.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments.

Embodiment 4

An embodiment of the present disclosure further provides a communication system, including the apparatus 800 for measuring a filtering characteristic as described in Embodiment 3, and further including communication equipment, the communication equipment being a transmitter and a receiver connected to each other, or a transceiver.

Figure 11:
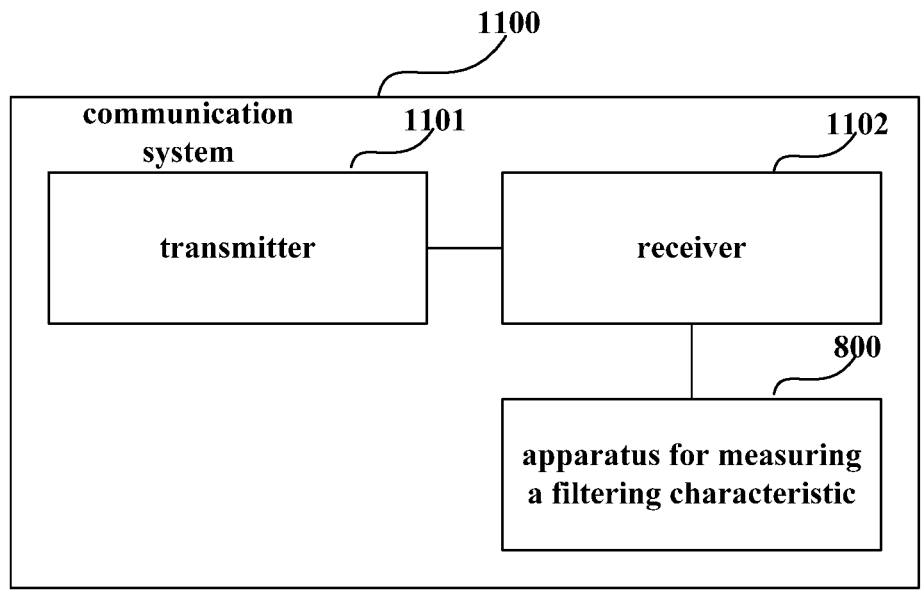
FIG. 11 is a schematic diagram of an implementation of the communication system in Embodiment 4.

FIG. 11 is a schematic diagram of a structure of the communication system of Embodiment 4. As shown FIG. 11, the communication system 1100 includes the apparatus 800 for measuring a filtering characteristic as described in Embodiment 3, which is configured to measure a filtering characteristic of a receiving end and a filtering characteristic of a transmitting end, a structure of which being as described in the above embodiment, and being not going to be described herein any further. The communication system includes a transmitter 1101 and a receiver 1102 connected to each other; wherein, FIGS. 1 and 2 may be referred to for particular schematic diagrams of the transmitter 1101 and the receiver 1102, which shall not be described herein any further. What differs from the transmitter and the receiver in FIGS. 1 and 2 exists in that in this embodiment, the emitter in the transmitter 1101 is configured to transmit the measurement signal; wherein, Embodiment 1 may be referred to for a particular implementation of the measurement signal, which shall not be described herein any further; and the transmitter 1101 and the receiver 1102 may further set frequency/frequencies of their transmitting laser and/or local laser, so as to obtain different frequency offsets.

In this embodiment, in measuring the filtering characteristic, a pre-equalizer of the transmitter 1101 is disabled by a setting unit in the apparatus for measuring a filtering characteristic of the communication system (which may also be provided in the transmitter or the receiver). The emitter of the transmitter 1101 transmits a measurement signal, passing through respective filtering modules of a transmitting end and a receiving end; the transmitter 1101 and the receiver 1102 control to change the frequencies of the transmitting laser and the local laser; then the receiver 1102 transmits a receiving signal obtained by the receiving end to the apparatus for measuring a filtering characteristic, which determines a final filtering characteristic of the receiving end or the transmitting end or a joint response, with a particular method being as that described in embodiments 1-2, which shall not be described herein any further.

Figure 12:
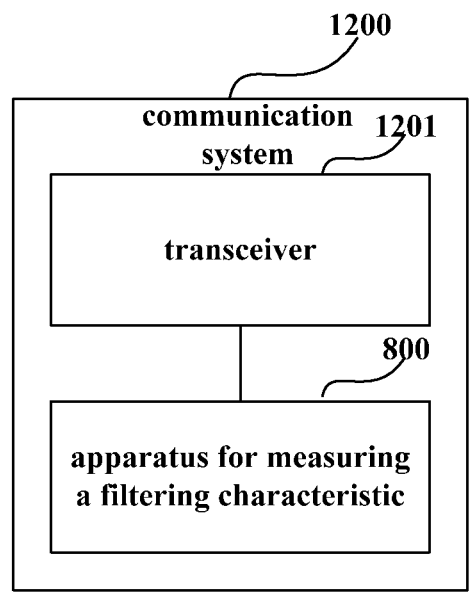
FIG. 12 is a schematic diagram of an implementation of the communication system in Embodiment 4.
Figure 13:
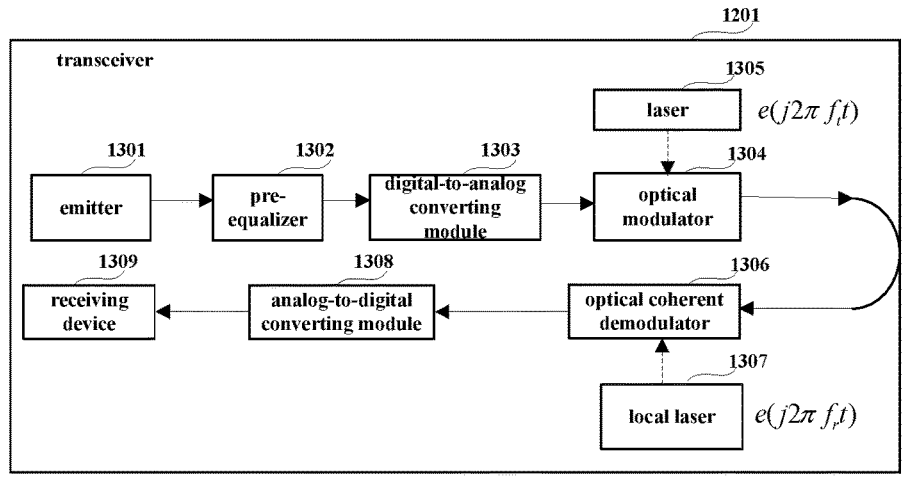
FIG. 13 is a schematic diagram of a transceiver in Embodiment 4.

FIG. 12 is a schematic diagram of a structure of the communication system in Embodiment 4 of the present disclosure. As shown in FIG. 12, the communication system is a transceiver 1201. FIG. 13 is a schematic diagram of a structure of the transceiver 1201. As shown in FIG. 13, the transmitting end and the receiving end of the transceiver are connected in an optical loopback manner, and the transceiver 1201 includes: an emitter 1301, a pre-equalizer 1302, a digital-to-analog converting module 1303, a laser 1304, an optical modulator 1305, an optical coherent demodulator 1306, a local laser 1307, an analog-to-digital converting module 1308 and a receiving device 1309, with their particular implementations being similar to the modules of the transmitter and the receiver in FIGS. 1 and 2, which shall not be described herein any further. What differs from the transmitter and the receiver in FIGS. 1 and 2 exists in that in this embodiment, the emitter 1301 in the transceiver 1201 is configured to transmit the measurement signal; wherein, Embodiment 1 may be referred to for a particular implementation of the measurement signal, which shall not be described herein any further; and the transceiver 1201 may further set frequency/frequencies of its transmitting laser 1305 and/or local laser 1307, so as to obtain different frequency offsets.

In this embodiment, in measuring the filtering characteristic, a pre-equalizer of the transceiver 1201 is disabled by a setting unit in the apparatus for measuring a filtering characteristic of the communication system. The emitter of the transceiver 1201 transmits the measurement signal, passing through respective filtering modules of a transmitting end and a receiving end. The transceiver 1201 controls to change the frequency offsets of the transmitting laser and the local laser; then the transceiver 1201 transmits a receiving signal obtained by the receiving end to the apparatus for measuring a filtering characteristic, which determines a final filtering characteristic of the receiving end or the transmitting end or a joint response, with a particular method being as that described in embodiments 1-2, which shall not be described herein any further.

It can be seen from this embodiment that the filtering characteristic of the receiving end and the filtering characteristic of the transmitting end are measured by keeping the measurement signal constant and changing the frequency offset between the transmitting laser and the local laser, with no need of use of extra instrument, thereby avoiding the problems of high cost and uneasy large-scale use brought about by measurement of filtering characteristic by using instruments.

Embodiment 5

An embodiment of the present disclosure further provides communication equipment, which differs from the communication equipment in Embodiment 4 that the functions of the apparatus for measuring a filtering characteristic in Embodiment 3 are incorporated into the communication equipment. The communication equipment may be a transmitter, a receiver, or a transceiver. For example, when the communication equipment is a transmitter, it is connected to another receiver; when the communication equipment is a receiver, it is connected to another transmitter; and when the communication equipment is a transceiver, a transmitting end and a receiving end of the transceiver are connected, such as in an optical loopback manner; however, this embodiment is not limited thereto.

Figure 14:
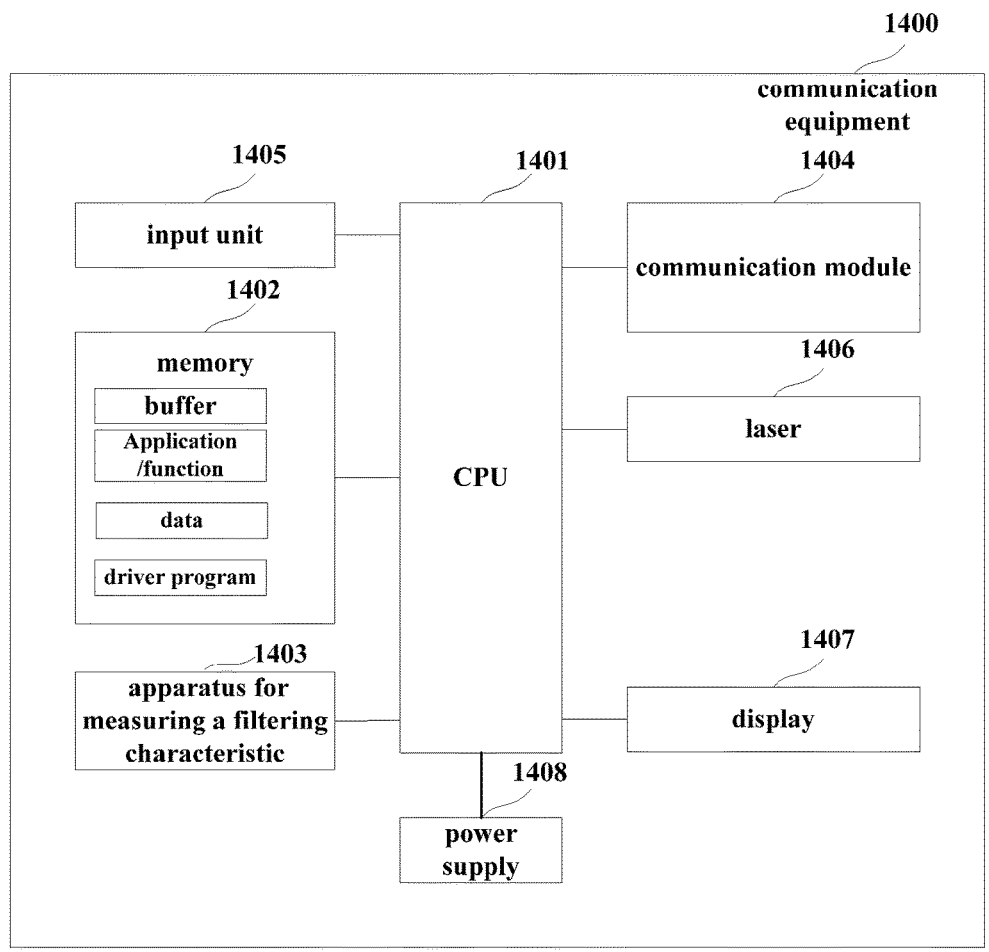
FIG. 14 is a schematic diagram of an implementation of the communication equipment in Embodiment 5.

FIG. 14 is a schematic diagram of the communication equipment of this embodiment. As shown in FIG. 14, the communication equipment 1400 may include a central processing unit (CPU) 1401 and a memory 1402, the memory 1402 being coupled to the central processing unit 1401. It should be noted that this figure is illustrative only, and other types of structures may also be used, so as to supplement or replace this structure and achieve telecommunications function or other functions. Wherein, the central processing unit 1401 is configured to control a emitter to transmit a measurement signal, and set frequency/frequencies of a transmitter laser and/or oscillator laser, so as to obtain different frequency offsets.

In an implementation, the functions of the apparatus for measuring a filtering characteristic in Embodiment 3 may be integrated into the central processing unit 1401.

The central processing unit 1401 is configured to determine a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiving end.

The central processing unit 1401 may further be configured to measure a joint response of the filtering characteristic of the receiving end and the filtering characteristic of the transmitting end, and determine the filtering characteristic of the transmitting end according to the filtering characteristic of the receiving end and the joint response.

The central processing unit 1401 may further be configured to determine the amplitudes of the receiving signal at the different frequency offsets, take the amplitude of the receiving signal at each frequency offset as a filtering characteristic of the receiving end at a frequency point to which each frequency offset corresponds, and determine the filtering characteristic of the receiving end according to the determined filtering characteristic of the receiving end at the frequency point to which each frequency offset corresponds.

The central processing unit 1401 may further be configured to determine the frequency offset according to the receiving signal, or calculate the frequency offset according to the frequencies of the transmitting laser and the local laser.

The central processing unit 1401 may further be configured to perform power calibration on the transmitting laser and the local laser; wherein, Embodiment 9 may be referred to for a particular implementation.

In another implementation, the apparatus for measuring a filtering characteristic described in Embodiment 3 and the central processing unit 1401 may be configured separately. For example, the apparatus may be configured as a chip connected to the central processing unit 1401 (see 1403 in FIG. 14), with its functions being realized under control of the central processing unit 1401.

As shown in FIG. 14, the communication equipment 1400 may further include a communication module 1404, an input unit 1405, a display 1407, and a power supply 1408. It should be noted that the communication equipment 1400 does not necessarily include all the parts shown in FIG. 14, and furthermore, the communication equipment 1400 may include parts not shown in FIG. 14, and the prior art may be referred to.

In this embodiment, when the communication equipment 1400 is a transmitter, it may further include a laser 1406, and the communication module 1404 is a signal transmitting module, and its structure may be identical to that of an existing transmitter, which may include, as shown in FIG. 1, an emitter 101, a pre-equalizer 102, a digital-to-analog converting module 103, a laser 104 and an optical modulator 105; however, the structure of the communication module 1404 is not limited to the above embodiment.

Figure 2:
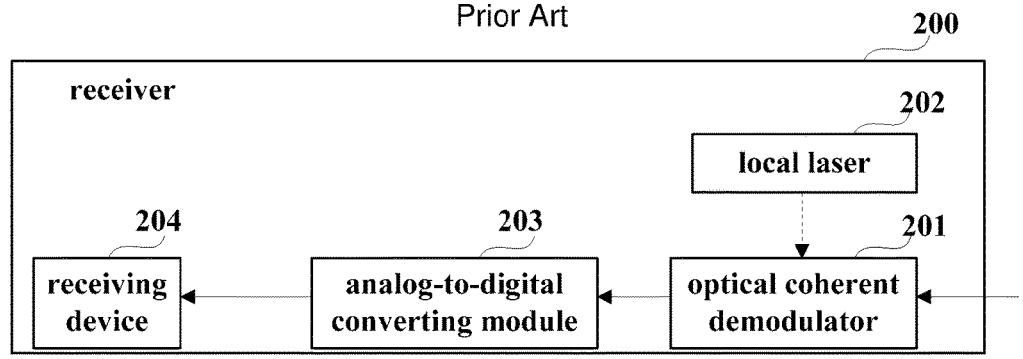
FIG. 2 is a schematic diagram of a receiver in the prior art.

In this embodiment, when the communication equipment 1400 is a receiver, it may further include a local laser (not shown), and the communication module 1404 is a signal receiving module, and its structure may be identical to that of an existing receiver, which may include, as shown in FIG. 2, an optical coherent demodulator 201, an analog-to digital converting module 203 and a receiving device 204; however, the structure of the communication module 1404 is not limited to the above embodiment.

In this embodiment, when the communication equipment 1400 is a transceiver, it may further include a laser 1406 and a local laser (not shown), and the communication module 1404 is a signal transmitting and receiving module, and its structure may be identical to that of an existing transceiver; for example, a transmitting module is similar to a transmitter, and a receiving module is similar to a receiver; however, the structure of the communication module 1404 is not limited to the above embodiment.

In this embodiment, when the apparatus for measuring a filtering characteristic does not include a setting unit, the communication equipment 1400 may further include a setting unit (not shown) configured to set the pre-equalizer of the transmitter or the transceiver, so as to disable the pre-equalizer; however, the setting unit may be carried out by the input unit 1405.

As shown in FIG. 14, the central processing unit 1401 is sometimes referred to as a controller or control, and may include a microprocessor or other processor devices and/or logic devices. The central processing unit 1401 receives input and controls operations of every components of the communication equipment 1400.

Wherein, the memory 1402 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 1401 may execute the program stored in the memory 1402, so as to realize information storage or processing, etc. Functions of other parts are similar to those of the prior art, which shall not be described herein any further. The parts of the communication equipment 1400 may be realized by specific hardware, firmware, software, or any combination thereof, without departing from the scope of the present disclosure.

In this embodiment, the communication equipment 1400 is, for example, a transmitter. And in measuring a filtering characteristic, the pre-equalizer in the communication module 1404 is disabled by the setting unit in the apparatus 1403 for measuring a filtering characteristic or the setting unit (such as the input unit 1405) in the communication equipment 1400. Then, under control of the CPU, the emitter in the communication module 1404 is enabled to transmit the measurement signal. The measurement signal passes through the transmitting end filtering module of the communication module 1404 and the receiving end filtering module of the receiver connected to the transmitter. Thereafter, under control of the CPU, the frequency of the laser 1406 and/or the frequency of the local laser of the receiver connected to the transmitter is/are changed, and the receiving signals at different frequency offsets are obtained from the receiver and are transmitted to the apparatus 1403 for measuring a filtering characteristic, which determines the final filtering characteristic of the receiving end or the transmitting end or the joint response, a particular method being as that described in embodiments 1-2, and being not going to be described herein any further.

In this embodiment, the communication equipment 1400 is, for example, a transceiver. And in measuring a filtering characteristic, the pre-equalizer in the communication module 1404 is disabled by the setting unit in the apparatus 1403 for measuring a filtering characteristic or the setting unit (such as the input unit 1405) in the communication equipment 1400. Then, under control of the CPU, the emitter in the communication module 1404 is enabled to transmit the measurement signal. The measurement signal passes through the transmitting end filtering module and the receiving end filtering module. Thereafter, under control of the CPU, the frequency of the laser 1406 and/or the frequency of the local laser is/are changed, and the obtained receiving signals at different frequency offsets are transmitted to the apparatus 1403 for measuring a filtering characteristic, which determines the final filtering characteristic of the receiving end or the transmitting end or the joint response, a particular method being as that described in embodiments 1-2, and being not going to be described herein any further.

In this embodiment, the communication equipment 1400 is, for example, a receiver. And in measuring a filtering characteristic, the pre-equalizer of the transmitter connected to the receiver is disabled by the setting unit in the apparatus 1403 for measuring a filtering characteristic or the setting unit (such as the input unit 1405) in the communication equipment 1400. Then, under control of the CPU, the emitter of a transmitter connected to the receiver is enabled to transmit the measurement signal. The measurement signal passes through the transmitting end filtering module and the receiving end filtering module of the communication module 1404 of the receiver. Thereafter, under control of the CPU, the frequency of the laser of the transmitter connected to the receiver and/or the frequency of the local laser of the receiver itself is/are changed, and under control of the CPU, the obtained receiving signals at different frequency offsets are transmitted to the apparatus 1403 for measuring a filtering characteristic, which determines the final filtering characteristic of the receiving end or the transmitting end or the joint response, a particular method being as that described in embodiments 1-2, and being not going to be described herein any further.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments.

Embodiment 6

Embodiment 6 of the present disclosure further provides an apparatus for measuring a filtering characteristic, which differs from the apparatus of Embodiment 3 in that in this embodiment, an emitter of an existing transmitter or a transceiver is not used, and only filtering modules of an existing transmitter, receiver or transceiver are used.

Figure 15:
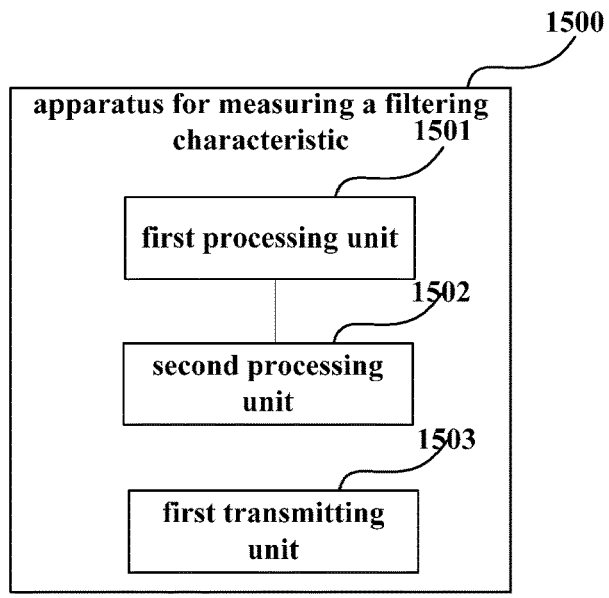
FIG. 15 is a schematic diagram of the apparatus for measuring a filtering characteristic in Embodiment 6.

FIG. 15 is a schematic diagram of a structure of an implementation of the apparatus of Embodiment 6. As shown in FIG. 15, the apparatus 1500 includes a first processing unit 1501 and a second processing unit 1502; wherein, the first processing unit 801 and the second processing unit 802 in Embodiment 3 may be referred to for particular implementations of the first processing unit 1501 and the second processing unit 1502, which shall not be described herein any further.

In this embodiment, the apparatus 1500 may further include a first transmitting unit 1503 configured to transmit a measurement signal, directly transmitting the measurement signal to a transmitting end filtering module of an existing transmitter or transceiver. The first processing unit 1501 may obtain receiving signals at different frequency offsets passing through the transmitting end filtering module and the receiving end filtering module, and determine final filtering characteristic of the receiving end and joint response, a particular method being as that described in embodiments 1-2, and being not going to be described herein any further.

In this embodiment, as it is not needed to make the measurement signal transmitted by the first transmitting unit 1503 to pass through a pre-equalizer of an existing transmitter or transceiver, the apparatus does not need to include the setting unit in Embodiment 3.

In this embodiment, the apparatus 1500 for measuring a filtering characteristic transmits the measurement signal, and transmits the measurement signal to the transmitting end filtering module of the transmitter or the transceiver. Then the measurement signal passes through the receiving end filtering module of the receiver connected to the transmitter or the receiving end filtering module of the transceiver. The receiving signals at different frequency offsets obtained from the receiving end are transmitted to the apparatus 1500, and the apparatus 1500 receives the receiving signals and determines the final filtering characteristics of the receiving end and the transmitting end and the joint response thereof, a particular method being as that described in embodiments 1-2, and being not going to be described herein any further.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments.

Embodiment 7

Embodiment 7 of the present disclosure further provides an apparatus for measuring a filtering characteristic, which differs from the apparatus 1500 in Embodiment 6 in that in this embodiment, a transmitting end filtering module of an existing transmitter or transceiver and a receiving end filtering module of an existing receiver or transceiver are not used.

Figure 16:
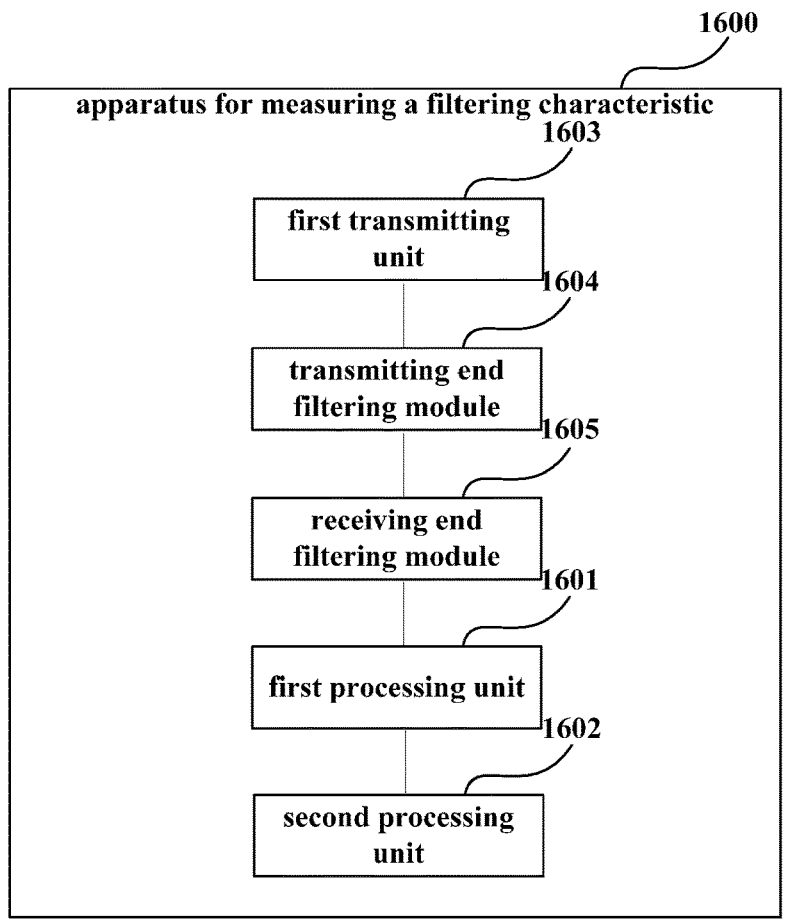
FIG. 16 is a schematic diagram of the apparatus for measuring a filtering characteristic in Embodiment 7.

FIG. 16 is a schematic diagram of a structure of an implementation of the apparatus of Embodiment 7. As shown in FIG. 16, the apparatus 1600 includes a first processing unit 1601, a second processing unit 1602 and a first transmitting unit 1603; wherein, the first processing unit 1501, the second processing unit 1502 and the first transmitting unit 1503 in Embodiment 6 may be referred to for implementations of the first processing unit 1601, the second processing unit 1602 and a first transmitting unit 1603, which shall not be described herein any further.

In this embodiment, the apparatus 1600 may further include a transmitting end filtering module 1604, which is equivalent to a filtering module of a transmitter or a transceiver of which a transmitting end filtering characteristic is to be measured, and a receiving end filtering module 1605, which is equivalent to a filtering module of a receiver or a transceiver of which a receiving end filtering characteristic is to be measured. The first transmitting unit 1603 transmits the measurement signal to the transmitting end filtering module 1604, passing through the receiving end filtering module 1605, so as to obtain receiving signals at different frequency offsets. Then the apparatus 1600 determines the final filtering characteristic of the receiving end or filtering characteristic of the transmitting end; wherein, embodiments 1-2 may be referred to for a particular implementation, which shall not be described herein any further.

In this embodiment, after determining the filtering characteristic of the transmitting end, the apparatus 1600 may transmit the filtering characteristic to a pre-equalizer of a transceiver or a transmitter, so that the pre-equalizer determines a pre-equalizer coefficient according to the filtering characteristic of the transmitting end, for use in pre-equalization processing.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments.

Embodiment 8

Embodiment 8 of the present disclosure further provides an apparatus for measuring a filtering characteristic, which differs from the apparatus 800 in Embodiment 3 in that in this embodiment, the apparatus for measuring a filtering characteristic sets frequencies of a transmitting laser and a local laser of a transmitter, a receiver or a transceiver, and the transmitter, the receiver or the transceiver themselves are not needed to set the frequencies of the transmitting laser and the local laser.

Figure 17:
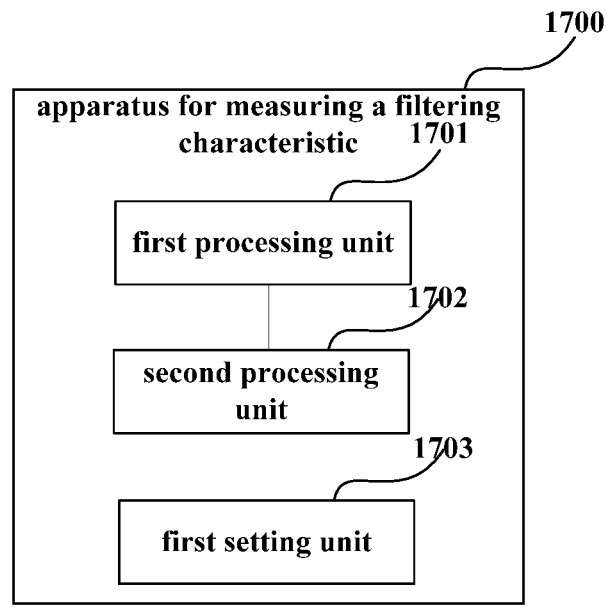
FIG. 17 is a schematic diagram of the apparatus for measuring a filtering characteristic in Embodiment 8.

FIG. 17 is a schematic diagram of a structure of an implementation of the apparatus of Embodiment 8. As shown in FIG. 17, the apparatus 1700 includes a first processing unit 1701 and a second processing unit 1702; wherein, the first processing unit 801 and the second processing unit 802 in Embodiment 3 may be referred to for implementations of the first processing unit 1701 and the second processing unit 1702, which shall not be described herein any further.

In this embodiment, the apparatus 1700 may further include a first setting unit 1703 configured to set a frequency/frequencies of a transmitting laser and/or a local laser, so as to obtain different frequency offsets.

In this embodiment, in measuring a filtering characteristic, a measurement signal is transmitted by an emitter of a transmitter or a transceiver and passes through a transmitting end filtering module and a receiving end filtering module, and the first setting unit 1703 of the apparatus 1700 changes the frequency of the transmitting laser and/or the frequency of the local laser. Then receiving signals at different frequency offsets are obtained, and the apparatus 1700 determines a final filtering characteristic of the receiving end or the transmitting end or a joint response, with a particular method being as that described in embodiments 1-2, which shall not be described herein any further.

In this embodiment, the apparatus 1700 may further include a first transmitting unit and a transmitting end filtering module and a receiving end filtering module (not shown), with implementations being as those described in embodiments 6 and 7, which shall not be described herein any further.

In this embodiment, after determining the filtering characteristic of the transmitting end, the apparatus 1700 may transmit the filtering characteristic to a pre-equalizer of a transceiver or a transmitter, so that the pre-equalizer determines a pre-equalizer coefficient according to the filtering characteristic of the transmitting end, for use in pre-equalization processing.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments.

Embodiment 9

In this embodiment, in order to improve accuracy of measurement, when a frequency/frequencies of a transmitting laser and/or a local laser change(s), power of the transmitting laser and/or the local laser needs to be kept stable.

In an implementation, Embodiment 9 further provides an apparatus for measuring a filtering characteristic, which differs from the apparatus 800 in Embodiment 3 in that the apparatus for measuring a filtering characteristic is further configured to calibrate the frequencies of the transmitting laser and the local laser.

Figure 18:
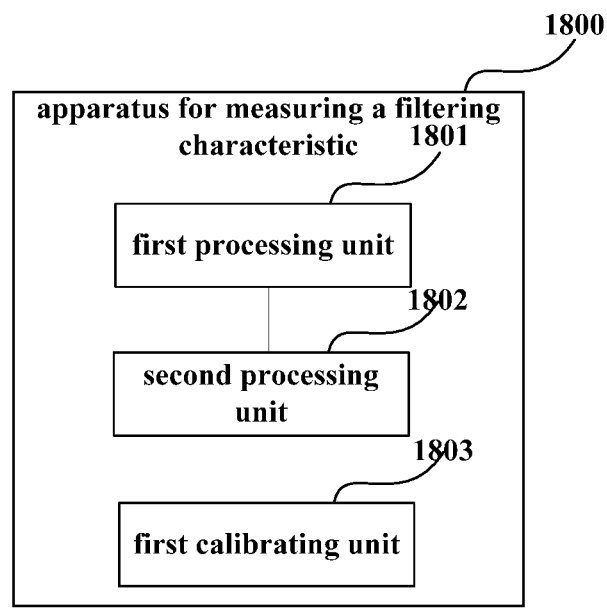
FIG. 18 is a schematic diagram of the apparatus for measuring a filtering characteristic in Embodiment 9.

FIG. 18 is a schematic diagram of a structure of an implementation of the apparatus of Embodiment 9. As shown in FIG. 18, the apparatus 1800 includes a first processing unit 1801 and a second processing unit 1802; wherein, the first processing unit 801 and the second processing unit 802 in Embodiment 3 may be referred to for implementations of the first processing unit 1801 and the second processing unit 1802, which shall not be described herein any further.

In this embodiment, the apparatus 1800 may further include a first calibrating unit 1803 configured to calibrate the frequencies of the transmitting laser and the local laser.

In this embodiment, the apparatus 1800 may further include a first transmitting unit, a transmitting end filtering module and a receiving end filtering module (not shown), and/or a first setting unit, with particular implementations being as those described in embodiments 6, 7 and 8, which shall not be described herein any further.

In this embodiment, a measuring unit (not shown) may further be included, which is configured to measure optical power. When the optical power changes, the first calibrating unit 1803 performs calibration, so that the optical power is kept stable; wherein, the measuring unit may be carried out by a photodetector PD; however, this embodiment is not limited thereto.

In another implementation, the first calibrating unit 1803 and the measuring unit may also be arranged in communication equipment, such as a transmitter, a receiver, or a transceiver. For example, in Embodiment 5, as shown in FIG. 14, a function of the first calibrating unit 1803 is integrated into the central processing unit 1401 of the communication equipment. The communication equipment further includes a photodetector (not shown) configured to measure optical power, and transmit a measurement result to the central processing unit 1401. And the central processing unit 1401 calibrates the power of the transmitting laser and the local laser.

In this embodiment, after determining the filtering characteristic of the transmitting end, the apparatus 1800 may transmit the filtering characteristic to a pre-equalizer of a transceiver or a transmitter, so that the pre-equalizer determines a pre-equalizer coefficient according to the filtering characteristic of the transmitting end, for use in pre-equalization processing.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments.

Embodiment 10

Figure 19:
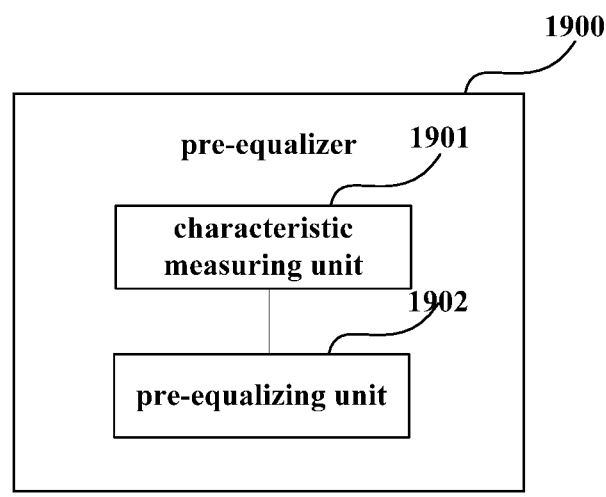
FIG. 19 is a schematic diagram of a pre-equalizer in Embodiment 10.

Embodiment 10 of the present disclosure further provides a pre-equalizer. FIG. 19 is a schematic diagram of a structure of the pre-equalizer in this embodiment. The pre-equalizer 1900 includes:

a characteristic measuring unit 1901 including an apparatus for measuring a filtering characteristic and configured to determine a filtering characteristic of a transmitting end; and a pre-equalizing unit 1902 configured to determine a coefficient of the pre-equalizer according to the filtering characteristic of the transmitting end, and perform pre-equalization on a transmission signal by using the coefficient of the pre-equalizer.

Wherein, any apparatus for measuring a filtering characteristic in embodiments 3 and 6-9 may be referred to for a particular implementation of the characteristic measuring unit 1901; and furthermore, the pre-equalizing unit 1902 may determine the coefficient of the pre-equalizer by using a zero-forcing method, and a minimum mean square error method, etc., and perform the pre-equalization on the transmission signal by using the coefficient and using a constant modulus algorithm, and this embodiment is not limited thereto.

Embodiment 11

Embodiment 11 further provides communication equipment, which may be a transceiver or a transmitter, and include the pre-equalizer in Embodiment 10; wherein, Embodiment 10 may be referred to for a particular implementation, which shall not be described herein any further.

It can be seen from this embodiment that the filtering characteristic of the receiving end and the filtering characteristic of the transmitting end are measured by changing the frequency offset between the transmitting laser and the local laser, with no need of use of extra instrument, thereby avoiding the problems of high cost and uneasy large-scale use brought about by measurement of filtering characteristic by using instruments. Furthermore, the coefficient of the pre-equalizer may be obtained by using the filtering characteristic obtained through the above measurement, so as to compensate for filtering damages brought about by the filtering modules by using the coefficient of the pre-equalizer.

With the embodiments, the filtering characteristics of the receiving end and the transmitting end may be determined by the transmitter and the receiver themselves, with no need of use of extra instrument, thereby avoiding the problems of high cost and uneasy large-scale use brought about by measurement of filtering characteristics by using instruments An embodiment of the present disclosure further provides a computer-readable program, wherein when the program is executed in an apparatus for measuring a filtering characteristic, the program enables a computer to carry out the method for measuring a filtering characteristic as described in Embodiment 1 or 2 in the apparatus for measuring a filtering characteristic.

An embodiment of the present disclosure provides a non-transitory computer readable storage medium in which a computer-readable program is stored, wherein the computer-readable program enables a computer to carry out the method for measuring a filtering characteristic as described in Embodiment 1 or 2 in an apparatus for measuring a filtering characteristic.

The preferred embodiments of the present disclosure are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

For implementations of the present disclosure containing the above embodiments, following supplements are further disclosed.

Supplement 1. A method for measuring a filtering characteristic, including:
transmitting a measurement signal;
passing through a transmitting end filtering module and a receiving end filtering module by the measurement signal, so as to obtain a receiving signal;
changing a frequency offset between a transmitting laser of the transmitting end and a local laser of the receiving end; and
determining a filtering characteristic of the receiving end according to amplitudes of the receiving signal at different frequency offsets.

Supplement 2. The method according to supplement 1, wherein the method further includes:
measuring a joint response of the filtering characteristic of the transmitting end and the filtering characteristic of the receiving end; and
determining the filtering characteristic of the transmitting end according to the filtering characteristic of the receiving end and the joint response.

Supplement 3. The method according to supplement 1, wherein setting a frequency of the transmitting laser and/or a frequency of the local laser, so as to obtain different frequency offsets.

Supplement 4. The method according to supplement 1, wherein the determining a filtering characteristic of the receiving end according to amplitudes of the receiving signal at different frequency offsets includes:
determining the amplitudes of the receiving signal at the different frequency offsets, and taking the amplitude of the receiving signal at each frequency offset as a filtering characteristic of the receiving end at a frequency point to which each frequency offset corresponds; and
determining the filtering characteristic of the receiving end according to the determined filtering characteristic of the receiving end at the frequency point to which each frequency offset corresponds.

Supplement 5. The method according to supplement 4, wherein the frequency offset is determined according to the receiving signal, or the frequency offset is calculated according to the frequencies of the transmitting laser and the local laser.

Supplement 6. The method according to supplement 1, wherein the measurement signal is a narrowband signal.

Supplement 7. The method according to supplement 6, wherein the narrowband signal is a direct current signal, a single-frequency signal, or a pseudo-random signal of a low Baud rate.

Supplement 8. The method according to supplement 1, wherein the method further includes:
performing power calibration on the transmitting laser and the local laser.

Supplement 9. A pre-equalization method, including:
determining a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiving end, and determining a filtering characteristic of the transmitting end according to the filtering characteristic of the receiving end and a joint response of the filtering characteristic of the receiving end and the filtering characteristic of the transmitting end; and
determining a coefficient of the pre-equalizer according to the filtering characteristic of the transmitting end, and performing pre-equalization on a transmission signal by using the coefficient of the pre-equalizer.

Supplement 10. An apparatus for measuring a filtering characteristic, including:
a first processing unit configured to determine a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiving end.

Supplement 11. The apparatus according to supplement 10, wherein the apparatus further includes:
a second processing unit configured to measure a filtering characteristic of the transmitting end;
the second processing unit comprising:
a first measuring unit configured to measure a joint response of the filtering characteristic of the receiving end and the filtering characteristic of the transmitting end; and a first determining unit configured to determine the filtering characteristic of the transmitting end according to the filtering characteristic of the receiving end and the joint response.

Supplement 12. The apparatus according to supplement 10, wherein the apparatus further includes:

a first setting unit configured to set a frequency of the transmitting laser and/or a frequency of the local laser, so as to obtain the different frequency offsets.

Supplement 13. The apparatus according to supplement 10, wherein the first processing unit includes:

a second determining unit configured to determine the amplitudes of the receiving signal at the different frequency offsets, and take the amplitude of the receiving signal at each frequency offset as a filtering characteristic of the receiving end at a frequency point to which each frequency offset corresponds; and a third determining unit configured to determine the filtering characteristic of the receiving end according to the filtering characteristic of the receiving end at the frequency point to which each frequency offset corresponds determined by the second determining unit.

Supplement 14. The apparatus according to supplement 13, wherein the first processing unit further includes:

a fourth determining unit configured to determine the frequency offset according to the receiving signal, or calculate the frequency offset according to the frequencies of the transmitting laser and the local laser.

Supplement 15. The apparatus according to supplement 10, wherein the measurement signal is a narrowband signal.

Supplement 16. The apparatus according to supplement 15, wherein the narrowband signal is a direct current signal, a single-frequency signal, or a pseudo-random signal of a low Baud rate.

Supplement 17. The apparatus according to supplement 10, wherein the apparatus further includes:

a first calibrating unit configured to perform power calibration on the transmitting laser and the local laser.

Supplement 18. The apparatus according to supplement 10, wherein the apparatus further includes:

a first transmitting unit configured to transmit the measurement signal.

Supplement 19. A pre-equalizer, comprising:

a characteristic measuring unit configured to determine a filtering characteristic of a receiving end according to an amplitude of a receiving signal obtained after a measurement signal passes through a transmitting end filtering module and a receiving end filtering module at provided different frequency offsets of a transmitting laser of a transmitting end and a local laser of the receiving end, and determine a filtering characteristic of the transmitting end according to the filtering characteristic of the receiving end and a joint response of the filtering characteristic of the receiving end and the filtering characteristic of the transmitting end; and a pre-equalizing unit configured to determine a coefficient of the pre-equalizer according to the filtering characteristic of the transmitting end, and perform pre-equalization on a transmission signal by using the coefficient of the pre-equalizer.

Supplement 20. An optical communication equipment, including the apparatus for measuring a filtering characteristic as described in supplement 10.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for measuring a filtering characteristic, comprising:
   a memory that stores a plurality of instructions; and
   a processor coupled to the memory and configured to execute the instructions to:
   determine a first filtering characteristic of a receiving end according to an amplitude of a received signal obtained after a measurement signal passes through a transmitting end filtering module and a receiving end filtering module at different frequency offsets of a transmitting laser of a transmitting end and a local laser of the receiving end,
   wherein, the processor configured to execute the instructions to:
   determine amplitudes of the received signal at the different frequency offsets, and take the amplitude of the receiving signal at each frequency offset as the first filtering characteristic of the receiving end at a frequency point to which each frequency offset corresponds; and
   determine the first filtering characteristic of the receiving end according to the determined first filtering characteristic of the receiving end at the frequency point to which each frequency offset corresponds.

2. The apparatus according to claim 1, wherein the processor further configured to execute the instructions to:
   measure a second filtering characteristic of the transmitting end;
   measure a joint response of the first filtering characteristic of the receiving end and the second filtering characteristic of the transmitting end; and
   determine the second filtering characteristic of the transmitting end according to the first filtering characteristic of the receiving end and the joint response.

3. The apparatus according to claim 1, wherein the processor further configured to execute the instructions to:
   set one of a frequency of the transmitting laser and the frequency of the local laser to obtain the different frequency offsets.

4. The apparatus according to claim 1, wherein the processor further configured to execute the instructions to:
   one of determine each frequency according to the receiving signal and calculate each frequency offset according to frequencies of the transmitting laser and the local laser.

5. The apparatus according to claim 1, wherein the measurement signal is a narrowband signal.

6. The apparatus according to claim 5, wherein the narrowband signal is one of a direct current signal, a single-frequency signal, and a pseudo-random signal of a low Baud rate.

7. The apparatus according to claim 1, wherein the processor further configured to execute the instructions to:
   perform power calibration on the transmitting laser and the local laser.

8. The apparatus according to claim 1, wherein the apparatus further comprises:
   a transmitter configured to transmit the measurement signal.

9. A pre-equalizer, comprising:
   a memory that stores a plurality of instructions; and
   a processor coupled to the memory and configured to execute the instructions to:

determine amplitudes of a received signal at different frequency offsets of a transmitting laser of a transmitting end and a local laser of a receiving end, and take the amplitude of the receiving signal at each frequency offset as a first filtering characteristic of the receiving end at a frequency point to which each frequency offset corresponds;

determine the first filtering characteristic of the receiving end according to the determined first filtering characteristic of the receiving end at the frequency point to which each frequency offset corresponds;

determine a second filtering characteristic of the transmitting end according to the first filtering characteristic of the receiving end and a joint response of the first filtering characteristic of the receiving end and the second filtering characteristic of the transmitting end; and determine a coefficient of the pre-equalizer according to the second filtering characteristic of the transmitting end, and perform pre-equalization on a transmission signal by using the coefficient of the pre-equalizer.

10. The pre-equalizer according to claim 9, wherein the pre-equalizer further comprises:

a transmitter configured to transmit the measurement signal.

11. An optical communication equipment, comprising the apparatus for measuring a filtering characteristic as claimed in claim 1.

* * * * *